United States Patent
Okamoto et al.

(10) Patent No.: US 8,037,269 B2
(45) Date of Patent: Oct. 11, 2011

(54) PORTABLE AUXILIARY STORAGE DEVICE

(75) Inventors: Satoshi Okamoto, Kyoto (JP); Taiho Nakazawa, Kyoto (JP); Sadatoshi Chozui, Osaka (JP); Koichi Morioka, Osaka (JP)

(73) Assignee: Panasonic Corporation, Osaka (JP)

( * ) Notice: Subject to any disclaimer, the term of this patent is extended or adjusted under 35 U.S.C. 154(b) by 540 days.

(21) Appl. No.: 12/092,600

(22) PCT Filed: Nov. 7, 2006

(86) PCT No.: PCT/JP2006/322125
§ 371 (c)(1),
(2), (4) Date: May 5, 2008

(87) PCT Pub. No.: WO2007/052798
PCT Pub. Date: May 10, 2007

(65) Prior Publication Data
US 2009/0125683 A1 May 14, 2009

(30) Foreign Application Priority Data
Nov. 7, 2005 (JP) .................... 2005-321951

(51) Int. Cl.
G06F 12/14 (2006.01)
G06F 12/16 (2006.01)

(52) U.S. Cl. . 711/163; 711/115; 711/164; 711/E12.001; 711/E12.093; 713/183; 713/184; 713/185; 713/186; 726/28

(58) Field of Classification Search .................. None
See application file for complete search history.

(56) References Cited

U.S. PATENT DOCUMENTS

| | | | |
|---|---|---|---|
| 5,282,247 A * | 1/1994 | McLean et al. | 711/164 |
| 5,790,670 A | 8/1998 | Bramlett | |
| 6,381,143 B1 * | 4/2002 | Nakamura | 361/737 |
| 6,496,119 B1 * | 12/2002 | Otterstedt et al. | 340/653 |
| 6,606,707 B1 | 8/2003 | Hirota et al. | |
| 6,802,008 B1 | 10/2004 | Ikefuji et al. | |
| 6,980,087 B2 * | 12/2005 | Zukowski | 340/10.51 |
| 7,257,714 B1 * | 8/2007 | Shen | 713/186 |

(Continued)

FOREIGN PATENT DOCUMENTS

CN 1316087 A 10/2001

(Continued)

OTHER PUBLICATIONS

International Search Report for International Application No. PCT/JP2006/322125 dated Jan. 23, 2007.

(Continued)

Primary Examiner — Hetul Patel
(74) Attorney, Agent, or Firm — RatnerPrestia

(57) ABSTRACT

Versatility of a memory card is improved by providing a memory card where data protection mode and normal mode can be selected at discretion. A portable auxiliary storage device includes a mode setting section, a mode detecting section and a memory access control section. The mode setting section allows a user to set a normal mode permitting reading data stored in a memory section or writing the data to the memory section without restriction and a data protection mode for restricting the reading or writing. The mode detecting section detects a mode set in the mode setting section. The memory access control section controls the read or write according to a state of the mode setting section detected by the mode detecting section.

5 Claims, 5 Drawing Sheets

U.S. PATENT DOCUMENTS

| | | | |
|---|---|---|---|
| 7,264,992 B2 * | 9/2007 | Hsueh et al. | 438/106 |
| 7,440,287 B1 * | 10/2008 | Ni et al. | 361/752 |
| 2003/0135706 A1 | 7/2003 | Lin et al. | |
| 2005/0005131 A1 | 1/2005 | Yoshida et al. | |
| 2005/0038757 A1 | 2/2005 | Wada | |
| 2007/0044020 A1 | 2/2007 | Iwatsu et al. | |
| 2008/0098172 A1 * | 4/2008 | Tsang et al. | 711/115 |

FOREIGN PATENT DOCUMENTS

| | | |
|---|---|---|
| CN | 2006800414956 | 11/2009 |
| JP | 60-037069 A | 2/1985 |
| JP | 62-102387 A | 5/1987 |
| JP | 01-248292 A | 10/1989 |
| JP | 02-299088 A | 12/1990 |
| JP | 07-200767 A | 8/1995 |
| JP | 08-166906 A | 6/1996 |
| JP | 11-120310 A | 4/1999 |
| JP | 2002-041361 A | 2/2002 |
| WO | WO 2005/031585 A1 | 4/2005 |

OTHER PUBLICATIONS

Supplementary European Search Report for Application No, EP 06823038, Nov. 12, 2008.

* cited by examiner

PORTABLE AUXILIARY STORAGE DEVICE

This Application is a U.S. National Phase Application of PCT International Application PCT/JP2006/322125.

TECHNICAL FIELD

The present invention relates to a portable auxiliary storage device that is a memory card capable of writing or reading digital data and has a data protection function capable of prohibiting data access by a third person even in a state in which the memory card is connected to a device.

BACKGROUND ART

A memory card of an SD card or the like (hereinafter, simply referred to as a "memory card"), a USB memory, and the like are portable auxiliary storage devices adopting a flash memory as a recording medium. Since these are designed in a small size, electronic data may be optimally carried. For example, when a personal computer (PC) having a card slot into which the memory card can be inserted is possessed at both working place and home, it is possible to store and carry only required data in the memory card without carrying the PC from the home to the working place or from the working place to the home each time. This convenience receives a support of the markets and the number of sales is rapidly increasing.

Confidential data on business or the like is usually stored in the portable auxiliary storage device. On the other hand, it may be frequently lost due to smallness. When the portable auxiliary storage device falls into the hands of a malicious third person, there is a problem in that business data may be copied and distributed through the internet.

Recently, with the improvement of networking infrastructure, the opportunity to perform electronic commercial transaction (so-called e-commerce) through the internet is increasing. For example, a user conducts the electronic commercial transaction such as online stock trading even while traveling. The user conducts the electronic commercial transaction using a PC provided in a guest chamber of a hotel or the like or a PC permanently installed in a so-called internet cafe. Personal information (for example, a user ID or password, a bank account number, a telephone number, and the like) used for the transaction is stored and carried in the portable auxiliary storage device. When it is forgotten to extract the portable auxiliary storage device from the PC of the traveling place or the PC of the internet cafe, the third person may freely use the personal information.

As described above, the portable auxiliary storage device of the memory card or the like is convenient, but it is necessary to surely perform security protection and conventionally a countermeasure thereof is being variously considered.

For example, a technique has been disclosed for prohibiting the read of information from the memory card after a lapse of a given time by requesting a write to a dummy area of predetermined data when information is read from the memory card and providing a timer within the memory card to count the lapse of the given time from the dummy write with the timer (for example, see Patent Document 1).

[Patent Document 1] Japanese Patent Unexamined Publication No. 7-200767

A memory card described in the above-mentioned Patent Document 1 has a certain effect as an information leakage countermeasure. However, in the above-mentioned memory card, the read of information within the memory by a third person may be prohibited, but also the information read of a memory card possessor himself may be prohibited. The above-mentioned Patent Document 1 describes an indication to postpone the prohibition of the information read by reperforming a dummy write in a period shorter than a predetermined time before the lapse thereof in the timer count when the possessor knows an operation of this memory card.

However, when this dummy write is often requested to the user, the usability of the memory card is significantly damaged. This situation may be avoided by always preparing both a memory card having a data protection function and a general memory card (without a protection function), but the case where the user is requested to always prepare a plurality of memory cards is contrary to the convenience of the memory card.

DISCLOSURE OF THE INVENTION

An object of the present invention is to improve versatility of a portable auxiliary storage device by enabling data protection mode and normal mode to be selected at discretion in one portable auxiliary storage device.

In view of the above problem, the portable auxiliary storage device of the present invention is an auxiliary storage device capable of selecting the data protection mode and the normal mode at discretion.

According to the present invention, the data protection mode and the normal mode can be selected at discretion in one portable auxiliary storage device and the versatility of the portable auxiliary storage device can be improved. Therefore, a free read/write is permitted by setting the normal mode when less important data is stored or the portable auxiliary storage device is shared, and a free read/write of information is restricted by setting the data protection mode when important data such as personal information or the like is stored, such that use classification is possible in one portable auxiliary storage device.

DESCRIPTION OF REFERENCE NUMERALS AND SIGNS

Figure 1:
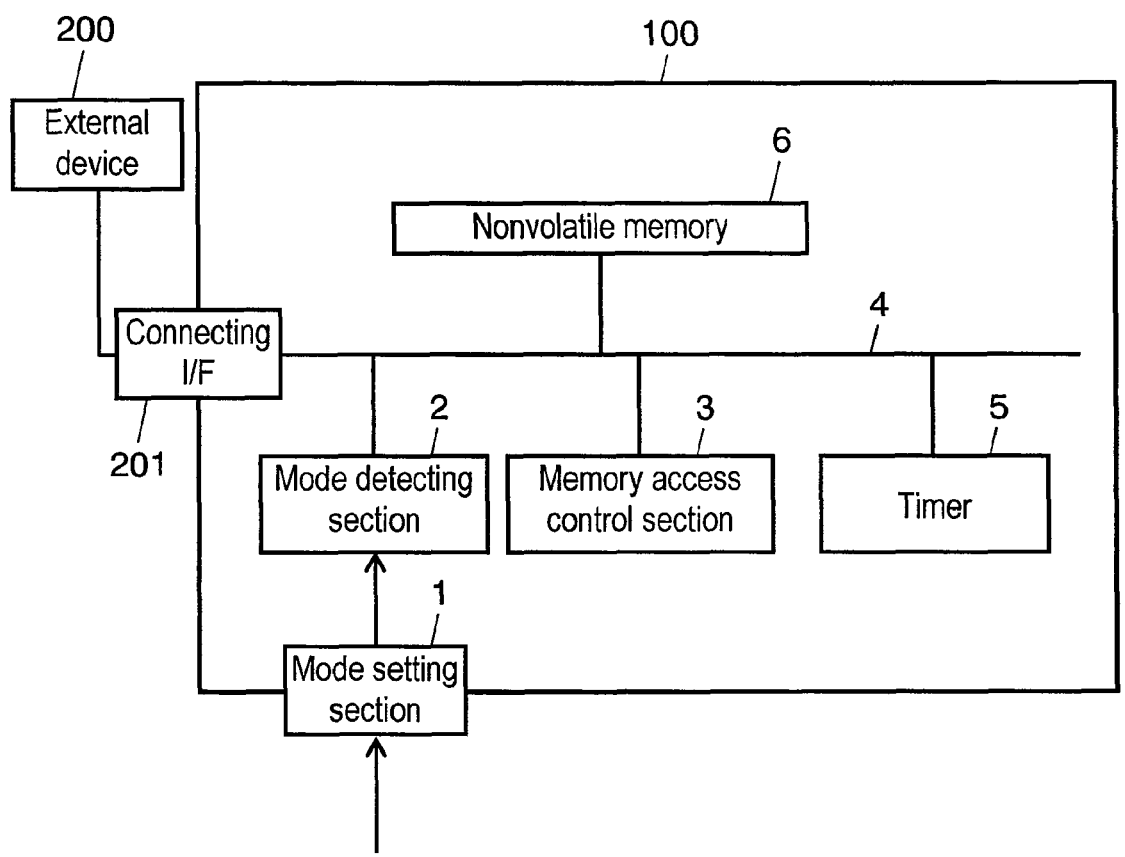
FIG. 1 is a block diagram showing a configuration of a memory card according to Embodiment 1 of the present invention.

| | |
|---|---|
| 1: | MODE SETTING SECTION |
| 2: | MODE DETECTING SECTION |
| 3: | MEMORY ACCESS CONTROL SECTION |
| 4: | DATA BUS |
| 5: | TIMER |
| 6: | NONVOLATILE MEMORY |

-continued

DESCRIPTION OF REFERENCE NUMERALS AND SIGNS

| 7: | PASSWORD SAVE SECTION |
|---|---|
| 8: | PASSWORD DETECTING SECTION |
| 9: | PASSWORD CONTROL SECTION |
| 10, 21: | SWITCH SECTION |
| 100: | MEMORY CARD |
| 200: | EXTERNAL DEVICE |
| 201: | CONNECTING INTERFACE |

DETAILED DESCRIPTION OF THE PREFERRED EMBODIMENTS

Specific embodiments of the present invention will be described below.

Embodiment 1

In Embodiment 1, the case where a memory card is used as a portable auxiliary storage device is illustrated and described.

FIG. 1 is a block diagram of a memory card 100 of the present invention.

In FIG. 1, normal mode for permitting a read/write without restriction and access mode for restricting the read/write can be set in mode setting section 1 by a user's intention. Mode detecting section 2 detects the mode set in mode setting section 1. Memory access control section 3 controls access to a nonvolatile memory according to a state of mode setting section 1 detected by mode detecting section 2.

In data bus 4, a variety of information such as a control signal, data, and the like is exchanged. For example, when information is read from the nonvolatile memory, a read control signal and a read address are sent from external device 200 to memory access control section 3 via connecting interface 201. On the other hand, when information is written to the nonvolatile memory, a write control signal and a write address is sent to memory access control section 3.

Timer 5 measures a time until memory access control section 3 switches from a permission state for permitting external device 200 to access the nonvolatile memory to a prohibition state for prohibiting the access. Nonvolatile memory 6 stores data or programs.

Hereinafter, an operation of the memory card of the invention will be described.

Figure 2A:
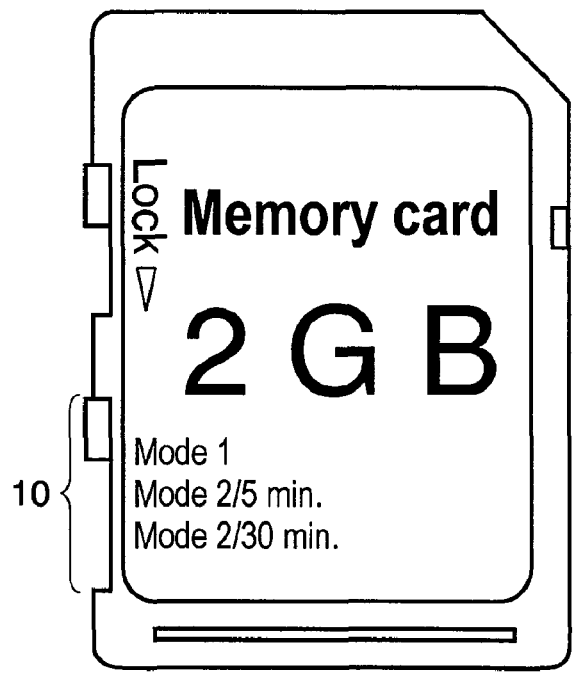
FIG. 2A is an external appearance view showing a front side of the memory card according to Embodiment 1 of the present invention.
Figure 2B:
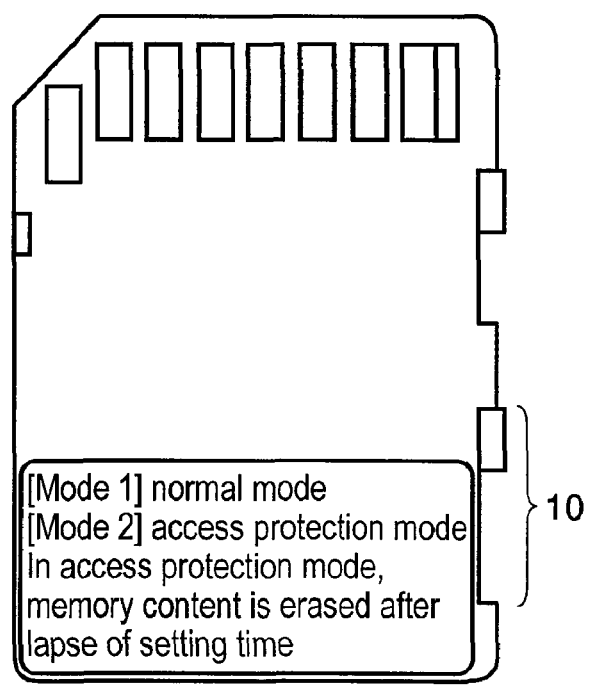
FIG. 2B is an external appearance view showing a backside of the memory card according to Embodiment 1 of the present invention.

FIG. 2A is an external appearance view showing a front side of the memory card according to Embodiment 1 of the present invention. FIG. 2B is an external appearance view showing a backside of the memory card according to Embodiment 1 of the present invention.

The user sets the mode of memory card 100 using mode setting section 1. Herein, mode setting section 1 can be configured as a mechanical switch, for example, as shown in switch section 10 of FIGS. 2A, 2B. When switch section 10 sets data protection mode to ON, the data protection mode is set.

In Embodiment 1, settable modes are described as two modes of the data protection mode and the normal mode. Herein, the data protection mode is the mode in which the timer counts a time at the starting point of data access by the user and every data access is prohibited when a given time is exceeded. In addition, there is mode in which data itself is erased or overwritten after the lapse of the given time or any one of the write and read is prohibited or the like, and any mode content is possible. Moreover, it is preferable that the given time to be counted by the timer can be arbitrarily set by the user. The normal mode is the mode for permitting the user to access data without any restriction. Furthermore, in this embodiment, the two modes are assumed and described, but at least three modes, for example, normal mode in which the read/write is freely enabled, read mode in which only the read is possible, and data protection mode in which every read/write is prohibited, can be switched.

An operation, when the user sets memory card 100 to the data protection mode in mode setting section 1, will be described.

First, a state of the data protection mode is output to mode detecting section 2. This mode detection is performed when memory access control section 3 is triggered by detecting access from external device 200 to nonvolatile memory 6. That is, when an access signal from external device 200, for example, a control signal for controlling the read, reaches memory access control section 3 via connecting interface 201, memory access control section 3 commands mode detecting section 2 to send a notification of the current mode of mode setting section 1.

Upon receiving this, mode detecting section 2 detects that the mode is the data protection mode, and then notifies memory access control section 3 that mode setting section 1 is in the data protection mode.

Memory access control section 3 detects that mode setting section 1 is in the data protection mode, and then initializes timer 5 and outputs a timer upper limit value and a timer timing signal (a signal indicating a timing start).

Timer 5 starts the count by receiving the timer timing signal from memory access control section 3. When a predetermined timer upper limit value is reached, a notification indicating that the timer upper limit is reached (a timer upper limit notification signal) is output to memory access control section 3. Memory access control section 3 permits data access through connecting interface 201 from external device 200 until the timer upper limit notification signal is input. Accordingly, external device 200 can freely perform the data write to nonvolatile memory 6 or the data read from nonvolatile memory 6.

On the other hand, when the data access (write or read control) from external device 200 is generated after the timer upper limit notification signal is input, memory access control section 3 prohibits this data access. That is, the data write to nonvolatile memory 6 or the data read from nonvolatile memory 6 is not performed. For example, the access prohibition is performed by clearing a control signal for controlling the read/write from the external device.

Next, an operation in case that the user sets memory card 100 to the normal mode in mode setting section 1 will be described.

In FIGS. 2A, 2B, the normal mode can be set by moving switch section 10 to an OFF side. In this case, memory access control section 3 makes no restriction for the data access from external device 200. Accordingly, external device 200 can freely read data stored in nonvolatile memory 6 of memory card 100 and write data to the nonvolatile memory.

According to Embodiment 1 of the present invention described above, the user can arbitrarily select the data protection mode and the normal mode in one memory card, and the versatility of the memory card can be improved. For example, when less important data is stored or the memory card is shared by a plurality of persons, a free read/write by a third person is permitted by setting the normal mode. When important data such as personal information or the like is stored, a free read/write of information is restricted by setting the data protection mode (or access is prohibited after a lapse of a given time according to a timer count), such that use classification is possible in one memory card.

Embodiment 1 of the present invention has been described above, but the present invention is not limited to this embodiment and is applicable to various aspects without damaging the object of the present invention.

For example, memory access control section 3 is configured to instruct the timer count start after detecting that mode setting section 1 is in the data protection mode at the starting point of the count by timer 5 in this Embodiment 1, but can be configured to instruct the timer count start at a time point of data access by external device 200, subsequently continue the time count when detecting that mode setting section 1 is in the data protection mode, and instruct the timer count stop when detecting that mode setting section 1 is in the normal mode.

Moreover, a configuration can be made to instruct the timer count start by detecting that a separate memory card is inserted into the external device or the connecting interface is connected to an interface.

On the other hand, a configuration can be made in which the timer count stop point is based on a lapse of a given time as in this Embodiment 1, the count is stopped at a time point when a power supply of the device is turned off during the timer count or the memory card is extracted from the device, and storage content of the nonvolatile memory is erased. A configuration in which detection means is provided to separately detect these situations and a total count time is accumulated in timer 5 or memory access control section 3 can be made. Accordingly, the dishonest act such as reset of the timer count by ON/OFF of the power supply can be prevented.

Moreover, it is preferable that memory access control section 3 is configured to store the mode set in mode setting section 1 in nonvolatile memory 6, make a comparison with previously stored mode, and forcibly erase data stored inside nonvolatile memory 6, for example, when detecting that a mode change is made from the data protection mode to the normal mode in this Embodiment 1. Accordingly, the act of a third person for switching the data protection mode to the normal mode and reading content of the nonvolatile memory can be prevented.

When the data protection mode is set in this Embodiment 1, data access to nonvolatile memory 6 by the possessor of the memory card is also restricted after the lapse of the given time. Consequently, a configuration in which data is opened to the possessor of the memory card by inputting a specific password even in the data protection mode can be made. Accordingly, access can be restricted without deleting given information for which the prohibition of access from the third person is desired.

In this case, it is preferable to classify a data area for which access is restricted in the data protection mode and a data area for which access is only possible in the normal mode on nonvolatile memory 6.

After the lapse of the given time in the data protection mode, a configuration for requesting a password for the user will be described using FIG. 3.

Figure 3:
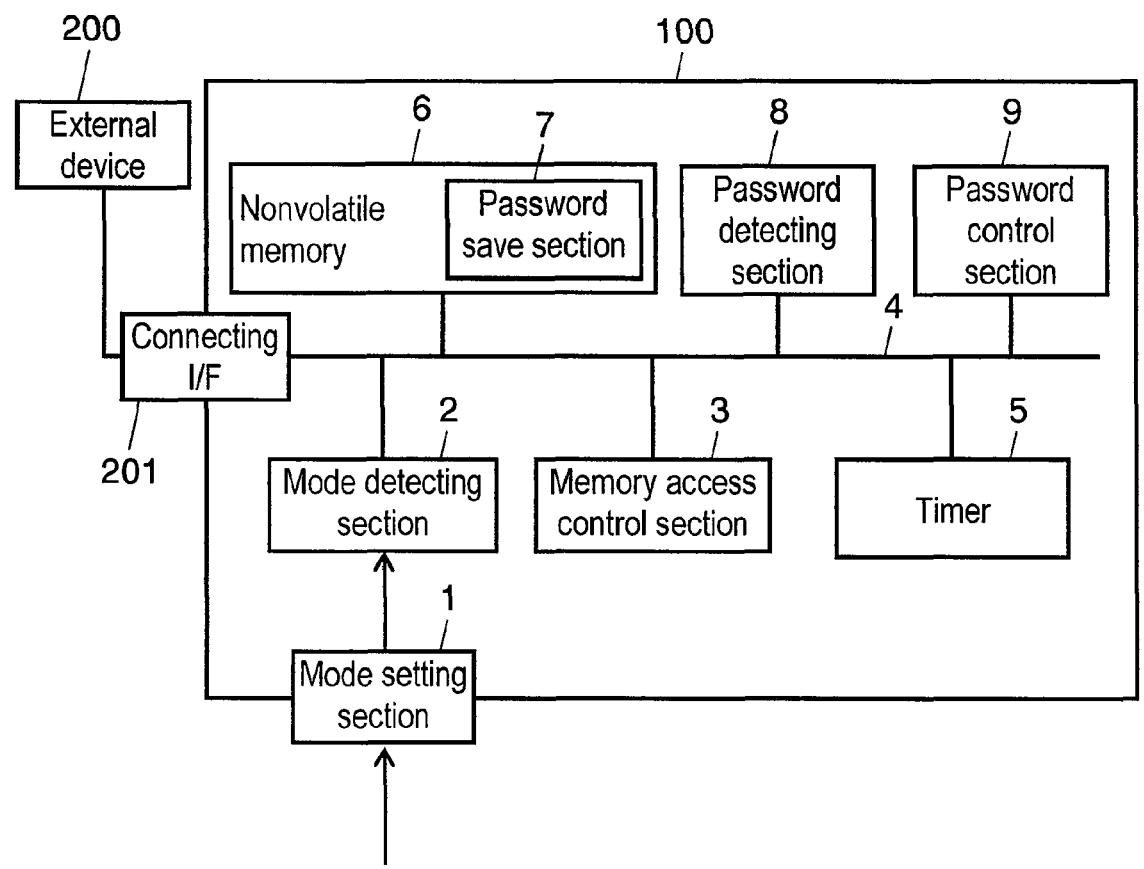
FIG. 3 is a block diagram showing another configuration of the memory card according to Embodiment 1 of the present invention.

FIG. 3 is a block diagram showing another configuration of the memory card according to Embodiment 1 of the present invention. In FIG. 3, a control signal is cleared in memory access control section 3 even when write or read control by external device 200 is generated in the case of an access prohibition state. In this example, memory access control section 3 transmits a signal for prompting to input the password to external device 200. External device 200 receiving this signal displays a screen for prompting to input the password on a display section not shown and waits the user to input the password. When password detecting section 8 detects an input of a specific password from external device 200, the detected password is sent to password control section 9.

Password control section 9 compares the detected password with a password stored in password save section 7 that configures one area of nonvolatile memory 6 or is separated from nonvolatile memory 6. When the two passwords are identical, an access prohibition state release notification is output to memory access control section 3.

Memory access control section 3 receiving the notification makes a change to a state in which desired data can be read from, or written to, nonvolatile memory 6, and initializes timer 5. In this case, a signal for instructing screen display indicating that the password input by the user is accepted can be output from memory access control section 3 to external device 200.

According to the above, a data protection mechanism is released and the access prohibition state is also released. When the password is set/changed/released, a control method dedicated to set/release a specific password is input using a user interface of the external device. When password detecting section 8 detects this control method, a detected process content/password is sent to password control section 9. Password control section 9 saves/changes the detected password in password save section 7, or deletes a password of password save section 7, according to the process content.

As the control method for setting/changing/releasing the specific password, there can be considered many methods using a new control signal indicating the password setting/change/release, using a new control command of the password setting/change/release, recognizing the password setting/change/release in a combination of a specific address and data unused in normal access, and the like.

In this Embodiment 1 described above, a slide switch mechanism serving as the physical switch for switching the data protection mode and the normal mode has been described as switch section 10. Alternatively, a switch for varying a concavo-convex shape according to mode switching, a switch for performing mode switching by bending a claw provided at an end portion of memory card 100, or the like is also possible.

In this Embodiment 1, an example in which a power supply for driving timer 5 or the like is not provided within memory card 100 has been described. Accordingly, drive power is supplied from external device 200 via connecting interface 201 when memory card 100 is inserted into external device 200. However, a configuration can be made such that an extremely small power supply section is provided within memory card 100 and timer 5 or the like is driven by power from this power supply section. It is preferable that this power supply section uses a device having a storage function such as a capacitor or condenser. Accordingly, while memory card 100 is inserted into external device 200, power supplied from external device 200 can be accumulated in this power supply section via connecting interface 201.

As the power supply section is provided within memory card 100 as described above, content of nonvolatile memory 6 can be erased by detecting mode switching from the data protection mode to the normal mode even when memory card 100 is not inserted into external device 200 or content of nonvolatile memory 6 can be erased after a lapse of a given time irrespective of insertion into external device 200 after a change to the data protection mode. When power for erasing content of nonvolatile memory 6 cannot be obtained, data can be pseudo-erased by thinning out data or the like.

In this Embodiment 1, the case where the memory card is used as the portable auxiliary storage device has been illustrated and described, but other storage devices can realize the present invention.

Figure 4:
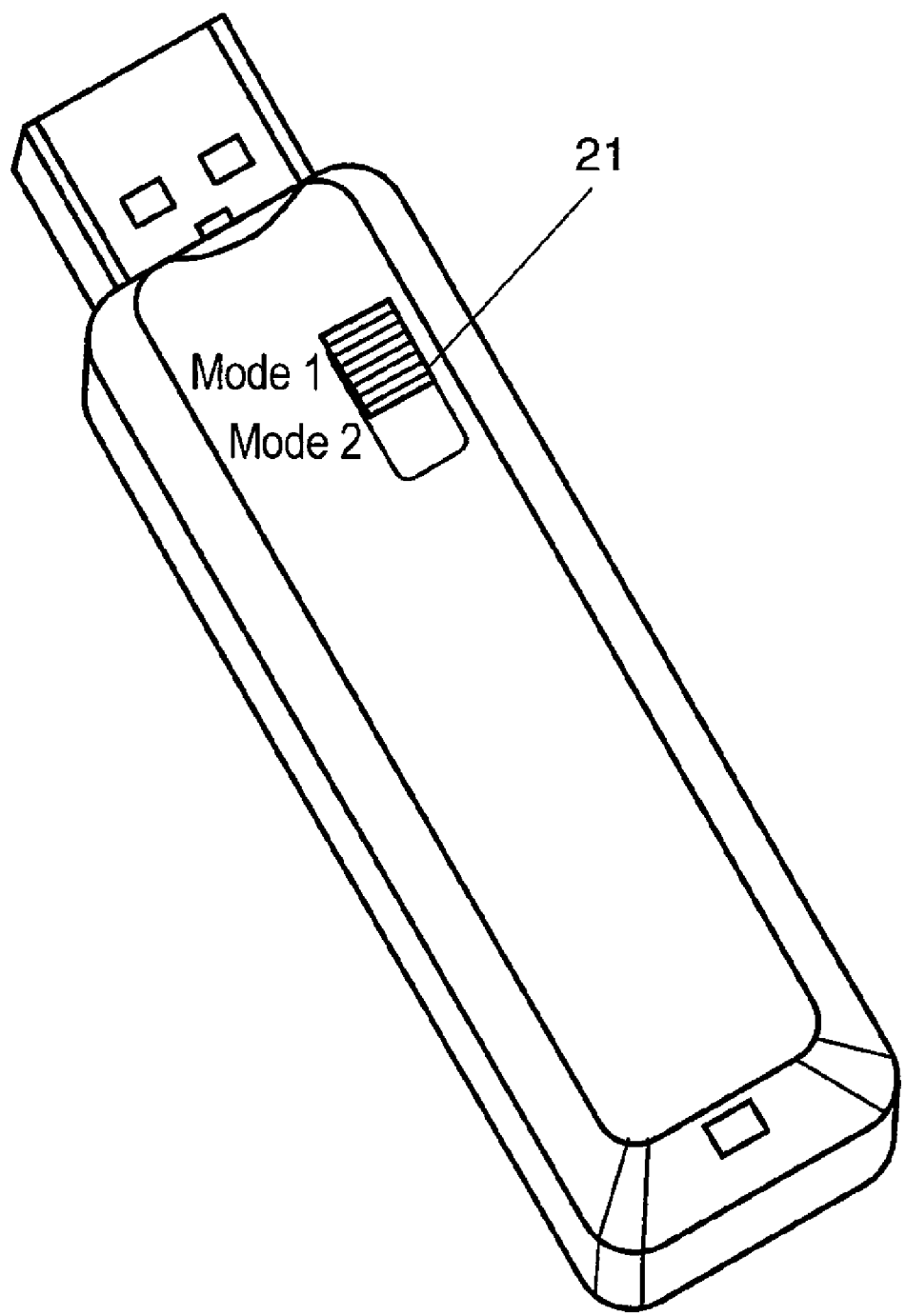
FIG. 4 is an external appearance view showing an outline of a USB memory according to Embodiment 1 of the present invention.

FIG. 4 is an external appearance view showing an outline of a USB memory according to Embodiment 1 of the present invention. As shown in FIG. 4, a configuration in which switch section 21 is provided in a USB memory card can be made. Since the USB memory card has a larger size (particularly, thickness) than the memory card, a design freedom degree of switch section 21 or an embedded power supply section is high. In particular, there is advantageous in that the power supply section can use a larger capacity than the case of the memory card.

Next, operation setting when mode setting is switched will be described using FIG. 5.

Figure 5:
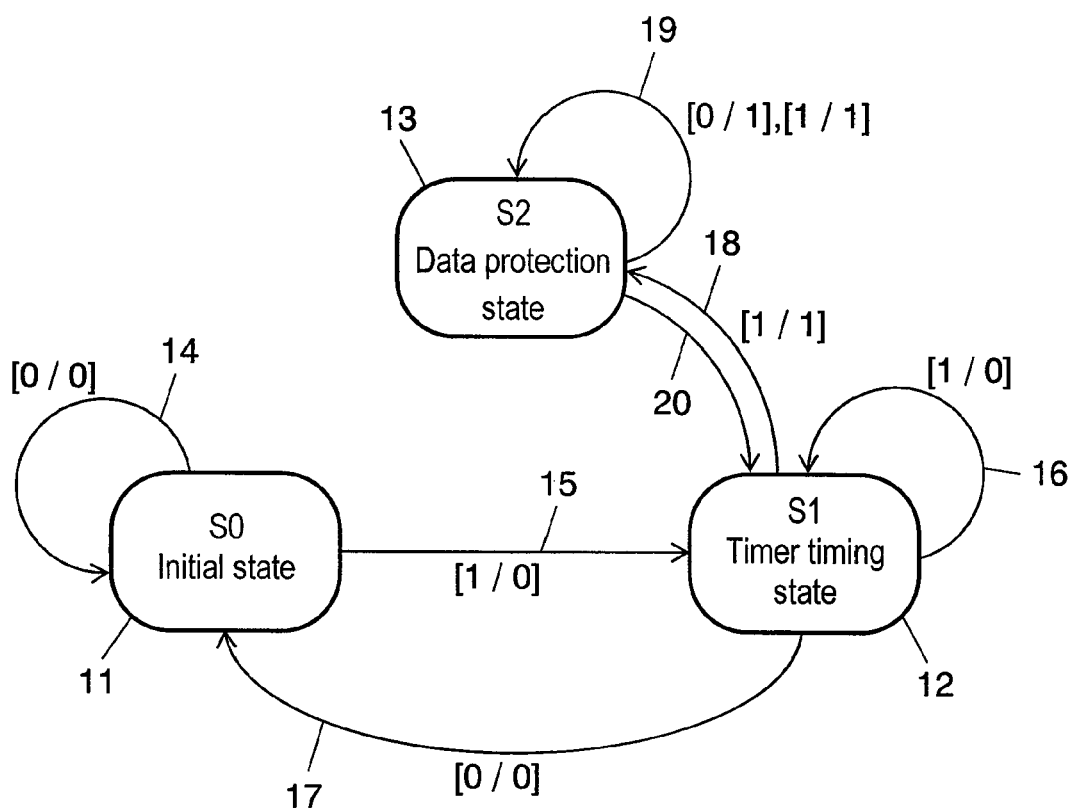
FIG. 5 is a state transition view illustrating an operating state of the memory card according to Embodiment 1 of the present invention.

FIG. 5 is a state transition view showing a control operation of memory access control section 3. In FIG. 2, initial state 11 indicates state S0 in which read or write access is possible in the memory card. Timer timing state 12 indicates state S1 in which timing is performed for data protection, and represents a state in which the read or write is normally performed. Data protection state 13 is state S2 in which the read or write access is prohibited.

Transition state 14 to transition state 19 indicate a state variation from each state. A numerical value at the left side of each state indicates a mode setting state. "1" denotes the data protection mode and "0" indicates the mode in which the normal read or write access is possible. On the other hand, in a state which the right side indicates whether or not a time to the data protection state has elapsed, "1" denotes a state in which a timer timing time reaches a setting value and "0" denotes a state in which the timer timing time does not reach the setting value.

Next, states of mode setting section 1 and timer 5 of FIG. 1 and an operation of memory access control section 3 will be described using FIG. 5.

Memory access control section 3 is set to initial state 11 at a time point when memory card 100 is connected to the device (S0). When the data protection mode is set in initial state 11 (transition state 15), a transition to timer timing state 12 is performed (S1). When the normal access mode is kept (transition state 14), initial state 11 is kept without the state transition (S0). There is no case where the timer reaches an upper limit value in the normal mode (which corresponds to 0/1 in FIG. 5) or the timer reaches the upper limit value in the data protection mode at the time of initial state S0 (which corresponds to 1/1 in FIG. 5).

In timer timing state 12, the timer value is initialized and the time measurement is started (S1).

When a setting change to the normal access mode is made in timer timing state 12 (transition state 17), a transition to initial state 11 is performed and the memory card is normally accessible (S0). When the upper limit value is not reached during timer timing (transition state 16), timer timing state 12 is kept without the state transition (S1). When timer timing reaches the upper limit (transition state 18), a transition to data protection state 13 for prohibiting access is performed (S2).

When the timer reaches the upper limit value in setting of the data protection mode in data protection state 13 (transition state 19), a transition from the state of data protection state 13 is not performed (S2). That is, a state in which the write or read is prohibited is set. Even when the timer reaches the upper limit value and the setting mode is changed from this state to the normal access mode, a transition from the state of data protection state 13 is not performed (S2). That is, a state in which the write or read is prohibited is kept. Accordingly, the leakage of data or programs to a third person is prevented. In this regard, when the timer is cleared by password authentication (transition state 20), a state in which the timer upper limit is not reached is set and the access prohibition state is released by transiting to timer timing state 12 (S1).

By recording a current state in each area for storing an access state on nonvolatile memory 6 in transition states 11~13, a configuration can be made such that the return from its state is made when the same card is reinserted even in the case where the card is extracted and inserted.

INDUSTRIAL APPLICABILITY

An auxiliary storage device according to the present invention can be used as a recording medium capable of safely managing data even in the case where it is accidentally inserted into a device or the like when digital media data or digital programs are saved in a large-capacity recording medium.

The invention claimed is:

1. A portable auxiliary storage device comprising:
    a mode setting section for allowing a user to set a normal mode for permitting reading data stored in a memory section and writing the data to the memory section without restriction and a data protection mode for restricting the reading and writing;
    a mode detecting section for detecting a mode set in the mode setting section; and
    a memory access control section for controlling the read and write according to a state of the mode setting section detected by the mode detecting section,
    wherein the memory access control section stores the mode detected by the mode detecting section in the memory section and erases the data stored in the memory section when a mode change is made from the data protection mode to the normal mode by making a comparison with a previously stored mode.

2. The portable auxiliary storage device of claim 1, further comprising:
    a timer section for counting a predetermined time,
    wherein, in the data protection mode, the read and write are permitted only when a count of the timer section is less than the predetermined time, and the read and write are prohibited by receiving a notification from the timer section when the count of the timer section reaches the predetermined time.

3. The portable auxiliary storage device of claim 2, wherein the mode setting section is a switch provided on a memory card.

4. The portable auxiliary storage device of claim 1, wherein the mode setting section is a switch provided on a memory card.

5. The portable auxiliary storage device according to claim 1, further comprising:
    a password save section for storing a password,
    wherein the memory access control section compares the password stored in the password save section and an input password in the data protection mode and releases a restriction of the read and write when both the passwords are identical.

* * * * *